United States Patent
Barbalho et al.

(10) Patent No.: US 11,403,183 B2
(45) Date of Patent: Aug. 2, 2022

(54) ITERATIVE INTEGER PROGRAMMING WITH LOAD BALANCE FOR CYCLIC WORKLOADS

(71) Applicant: EMC IP Holding Company LLC, Hopkinton, MA (US)

(72) Inventors: Hugo de Oliveira Barbalho, Rio de Janeiro (BR); Tiago Salviano Calmon, Rio de Janeiro (BR); Eduardo Vera Sousa, Niterói (BR)

(73) Assignee: EMC IP Holding Company LLC, Hopkinton, MA (US)

( * ) Notice: Subject to any disclaimer, the term of this patent is extended or adjusted under 35 U.S.C. 154(b) by 106 days.

(21) Appl. No.: 16/862,561

(22) Filed: Apr. 29, 2020

(65) Prior Publication Data
US 2021/0342226 A1 Nov. 4, 2021

(51) Int. Cl.
*G06F 11/00* (2006.01)
*G06F 11/14* (2006.01)
*G06F 9/50* (2006.01)

(52) U.S. Cl.
CPC .......... *G06F 11/1461* (2013.01); *G06F 9/505* (2013.01); *G06F 11/1451* (2013.01); *G06F 11/1453* (2013.01); *G06F 11/1464* (2013.01); *G06F 11/1469* (2013.01)

(58) Field of Classification Search
CPC ............. G06F 11/1461; G06F 11/1451; G06F 11/1453; G06F 11/1464; G06F 11/1469; G06F 11/1446; G06F 11/146; G06F 9/505
See application file for complete search history.

(56) References Cited

U.S. PATENT DOCUMENTS

| | | | |
|---|---|---|---|
| 9,185,188 B1 * | 11/2015 | Li | G06F 3/0647 |
| 10,606,709 B1 * | 3/2020 | Bansal | G06F 9/5072 |
| 10,929,245 B1 * | 2/2021 | Natanzon | G06F 11/1466 |
| 2008/0154979 A1 * | 6/2008 | Saitoh | G06F 11/1464 |
| 2009/0307283 A1 * | 12/2009 | Lehr | G06F 11/1461 |

(Continued)

OTHER PUBLICATIONS

"Data Protection Market is Anticipated to Grow US$ 120 Billion by 2023"; MarketWatch; Jan. 16, 2019.

(Continued)

*Primary Examiner* — Joseph D Manoskey
(74) *Attorney, Agent, or Firm* — Chamberlain, Hrdlicka, White, Williams & Aughtry

(57) ABSTRACT

A backup orchestrator for providing backup services to entities includes storage for storing recovery point objectives for the entities and a backup manager. The backup manager selects an optimization periodicity based a number of backups to be generated to meet a portion of the recovery point objectives; makes a determination that at least one of the portion of the recovery point objectives has a maximum allowable unbacked up period of time that is greater than the optimization periodicity; in response to the determination: load balances the number of backups across multiple optimization periods, based on the optimization periodicity, of a balanced backup schedule; selects a backup generation time for each of the to be generated backups in each of the optimization periods of the balanced backup schedule; and generates the number of backups using the balanced backup schedule.

17 Claims, 11 Drawing Sheets

(56) References Cited

U.S. PATENT DOCUMENTS

| | | | |
|---|---|---|---|
| 2014/0250283 A1* | 9/2014 | Boullery | G06F 11/1461 |
| | | | 711/162 |
| 2017/0364415 A1* | 12/2017 | Formato | G06F 11/1464 |
| 2018/0067819 A1* | 3/2018 | Kotha | G06F 11/1461 |
| 2019/0278661 A1* | 9/2019 | Mehta | G06F 11/1451 |

OTHER PUBLICATIONS

"Error function"; Wikipedia; Jan. 24, 2020 (https://en.wikipedia.org/w/index.php?title=Error_function&oldid=937354450).

David Reinsel et al.; "Data Age 2025: The Evolution of Data to Life-Critical—Don't Focus on Big Data; Focus on the Data That's Big"; IDC White Paper, Sponsored by Seagate; Apr. 2017.

Ludmila Cherkasova et al.; "DP+IP = Design of Efficient Backup Scheduling"; Proceedings of the 6th International Conference on Network and Service Management (CNSM 2010); pp. 118-125; Oct. 25-29, 2010 (doi: 10.1109/DNSM.2010.5691322).

Ludmila Cherkasova et al.; "Enhancing and Optimizing a Data Protection Solution"; 2009 IEEE International Symposium on Modeling, Analysis & Simulation of Computer and Telecommunication Systems (MASCOTS); 2009.

Wen Xia et al; "A Comprehensive Study of the Past, Present, and Future of Data Deduplication"; Proceedings of the IEEE; vol. 104, No. 9; pp. 1681-1710; Sep. 2016.

Yaobin Qin et al.; "HyperProtect: Enhancing the Performance of a Dynamic Backup System Using Intelligent Scheduling"; 2018 IEEE 37th International Performance Computing and Communications Conference (IPCCC); Nov. 17-19, 2018.

\* cited by examiner

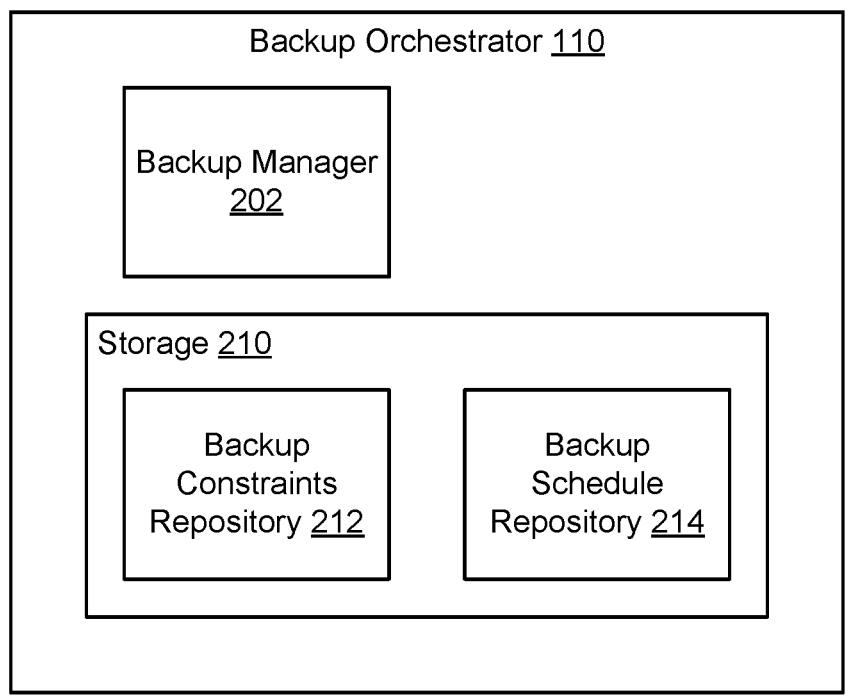
FIG. 2.1

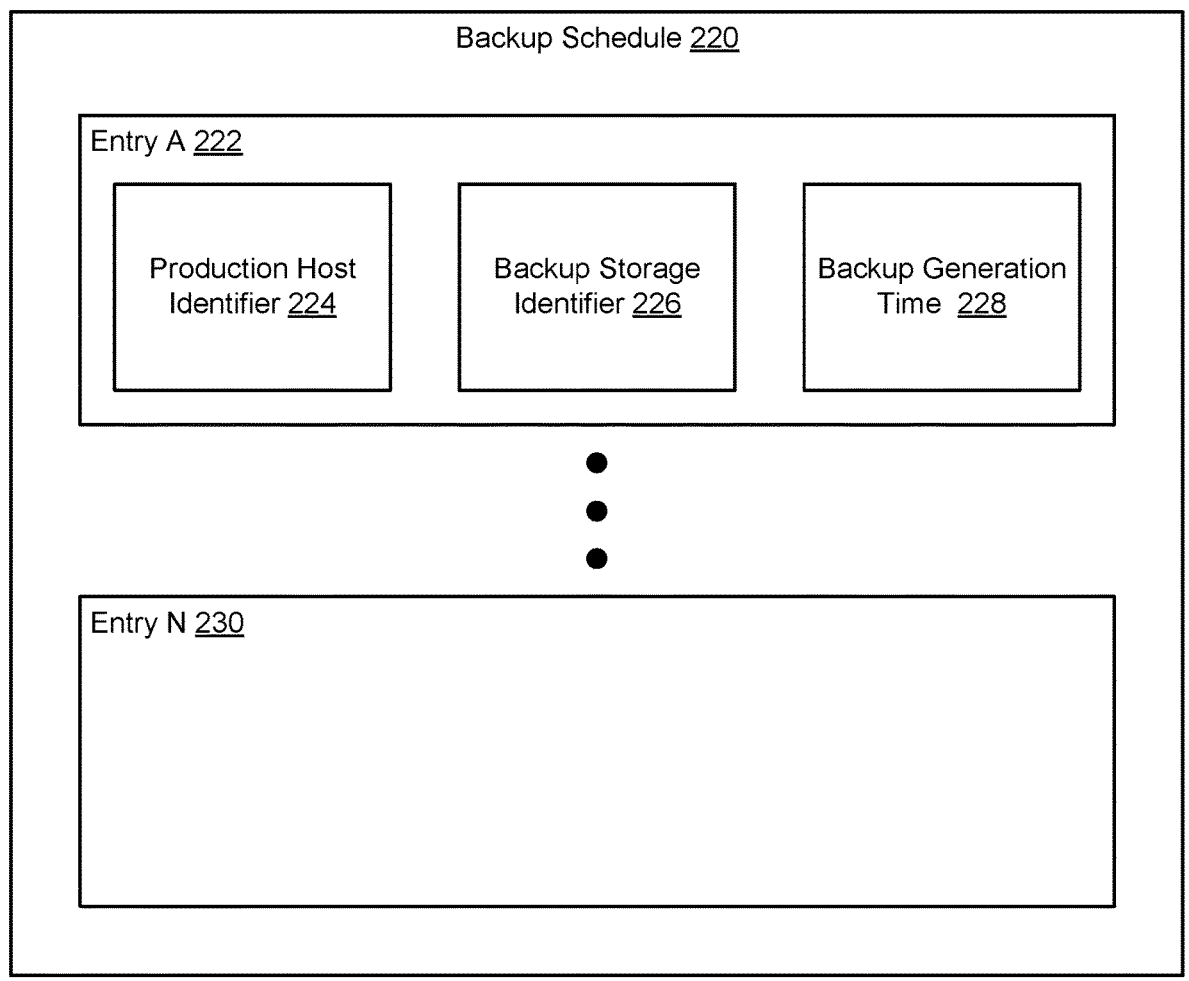
FIG. 2.2

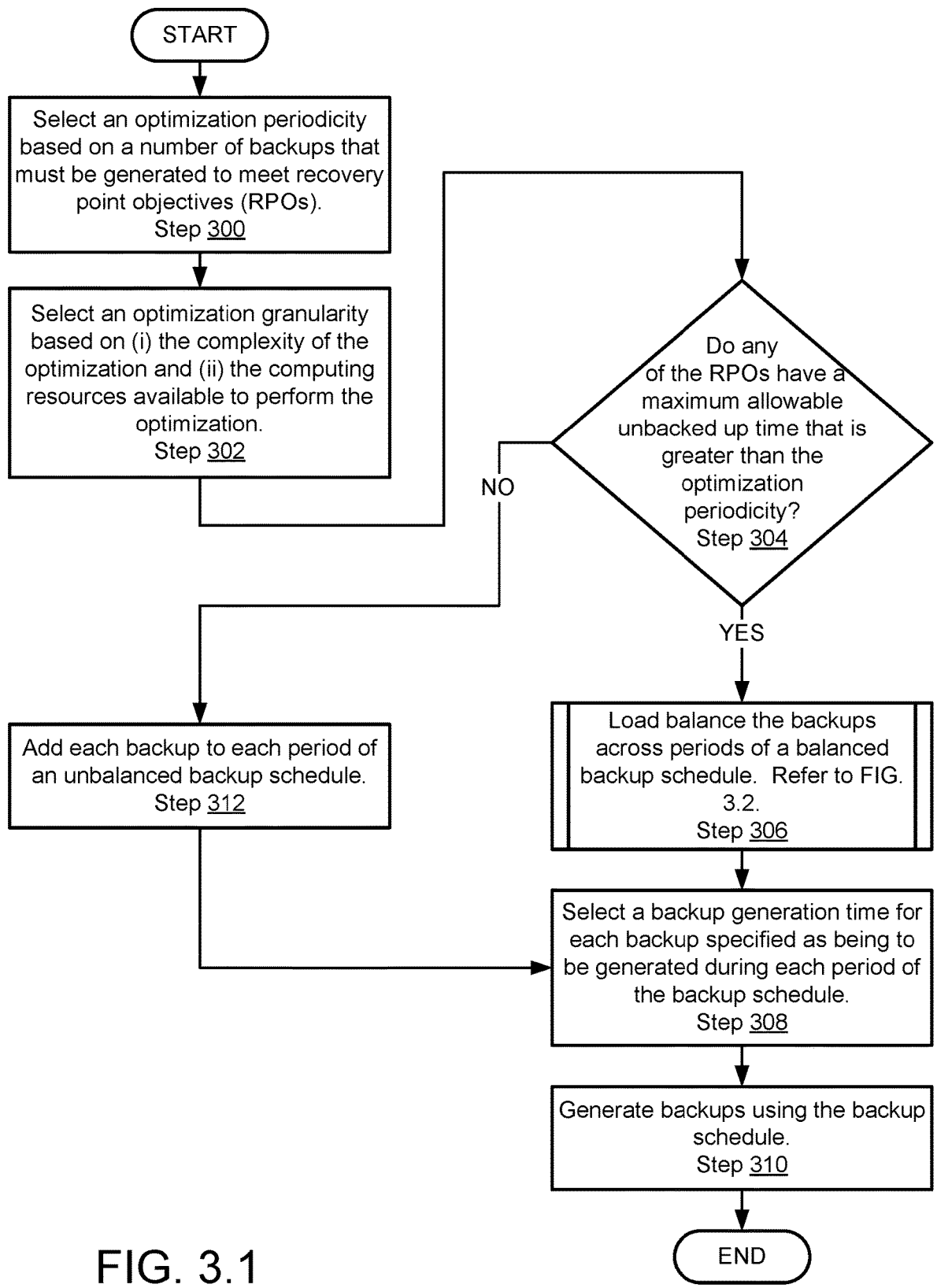
FIG. 3.1

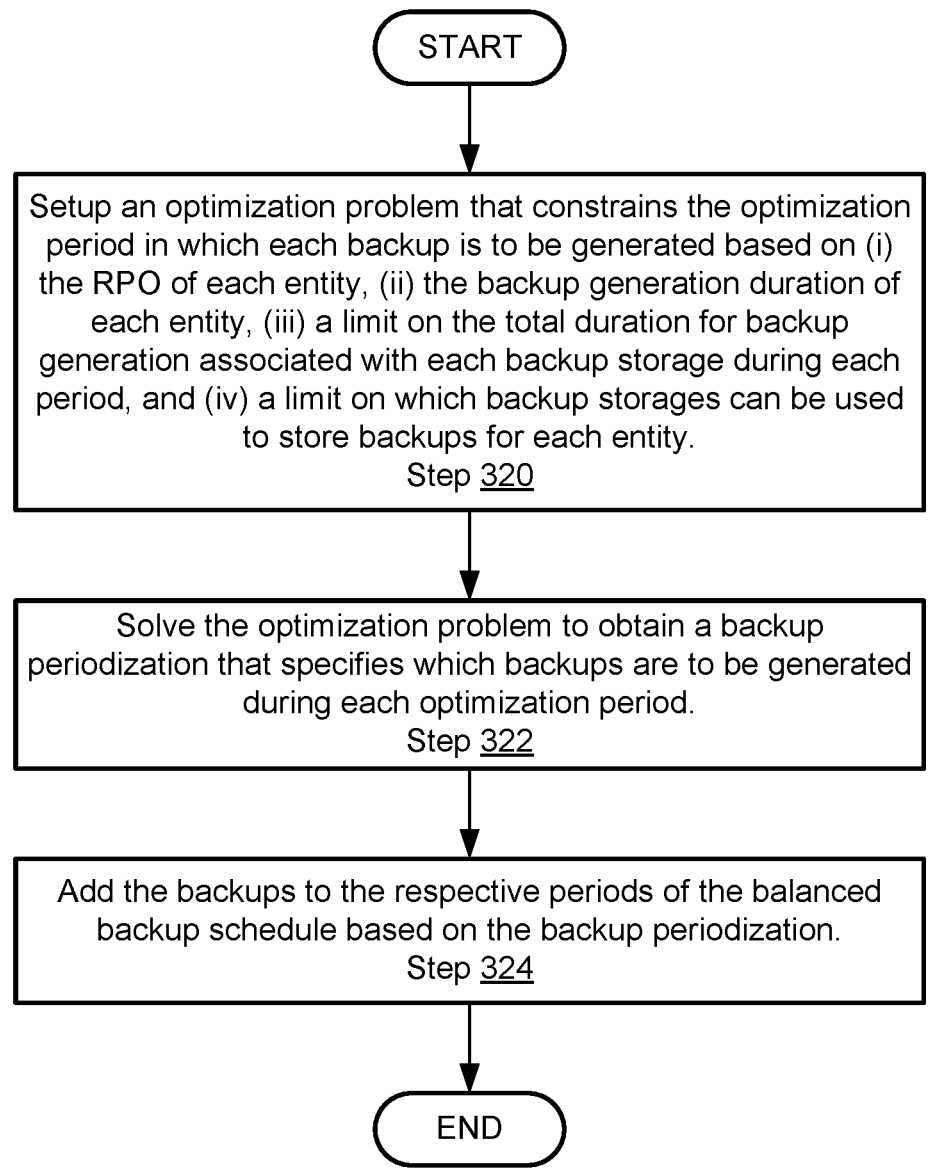
FIG. 3.2

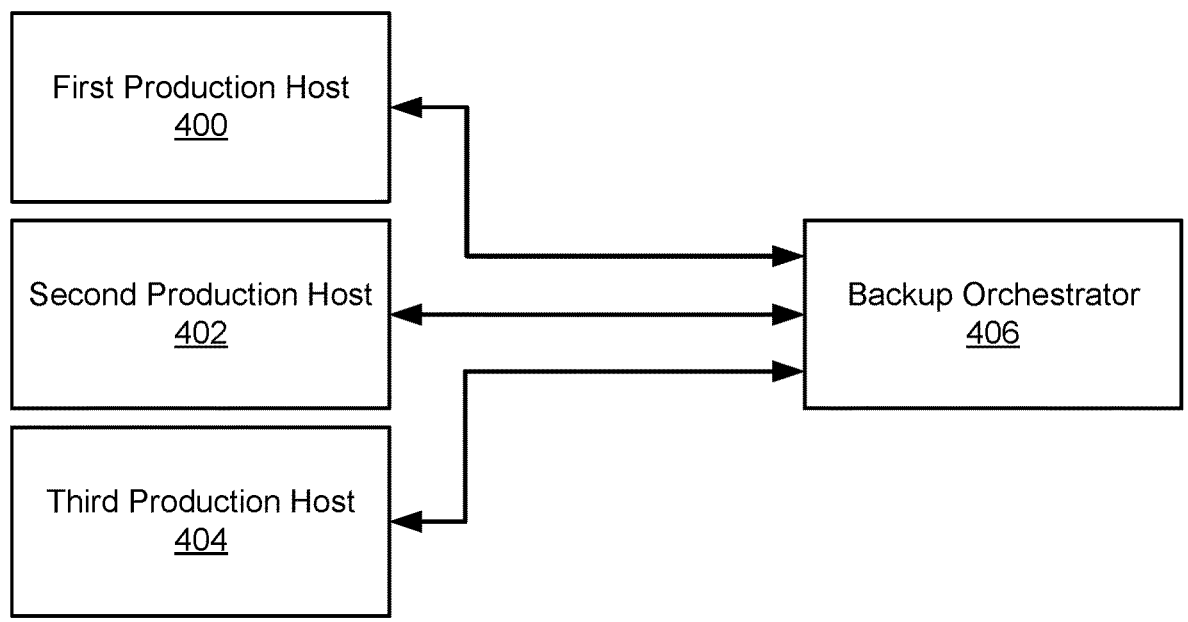
FIG. 4.1

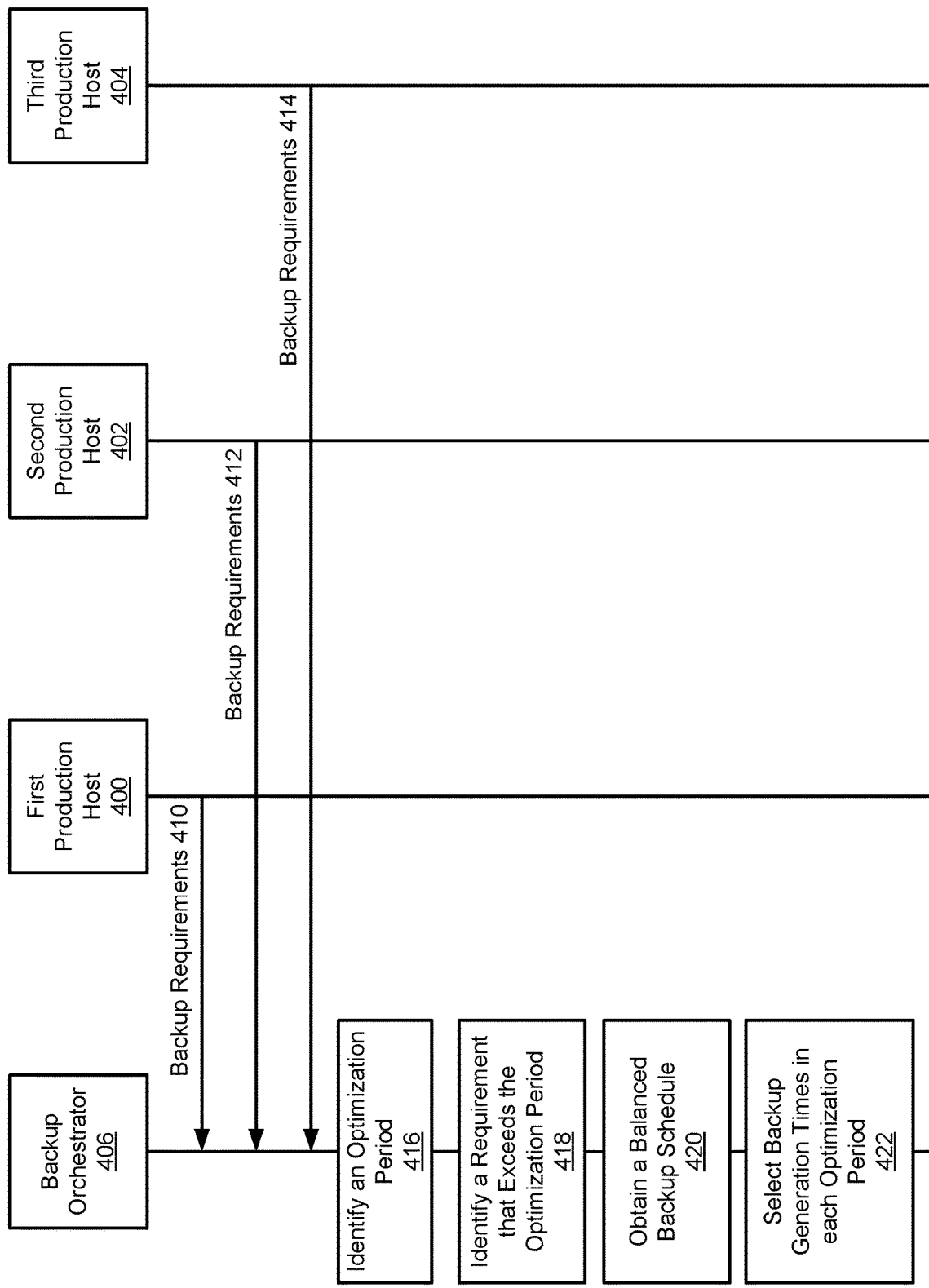
FIG. 4.2

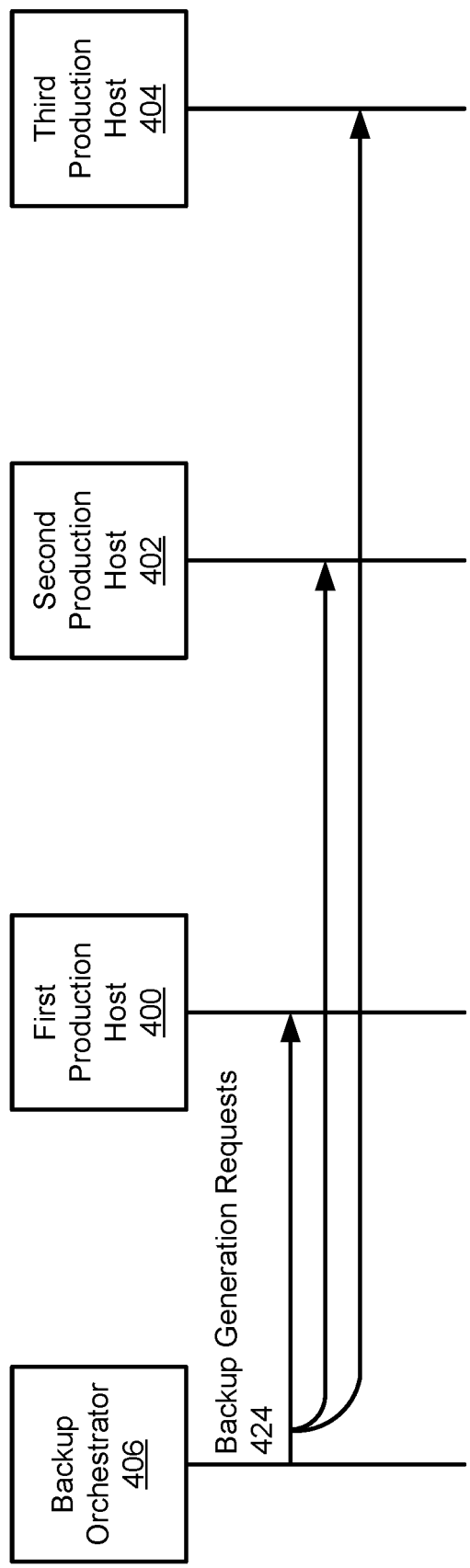
FIG. 4.3

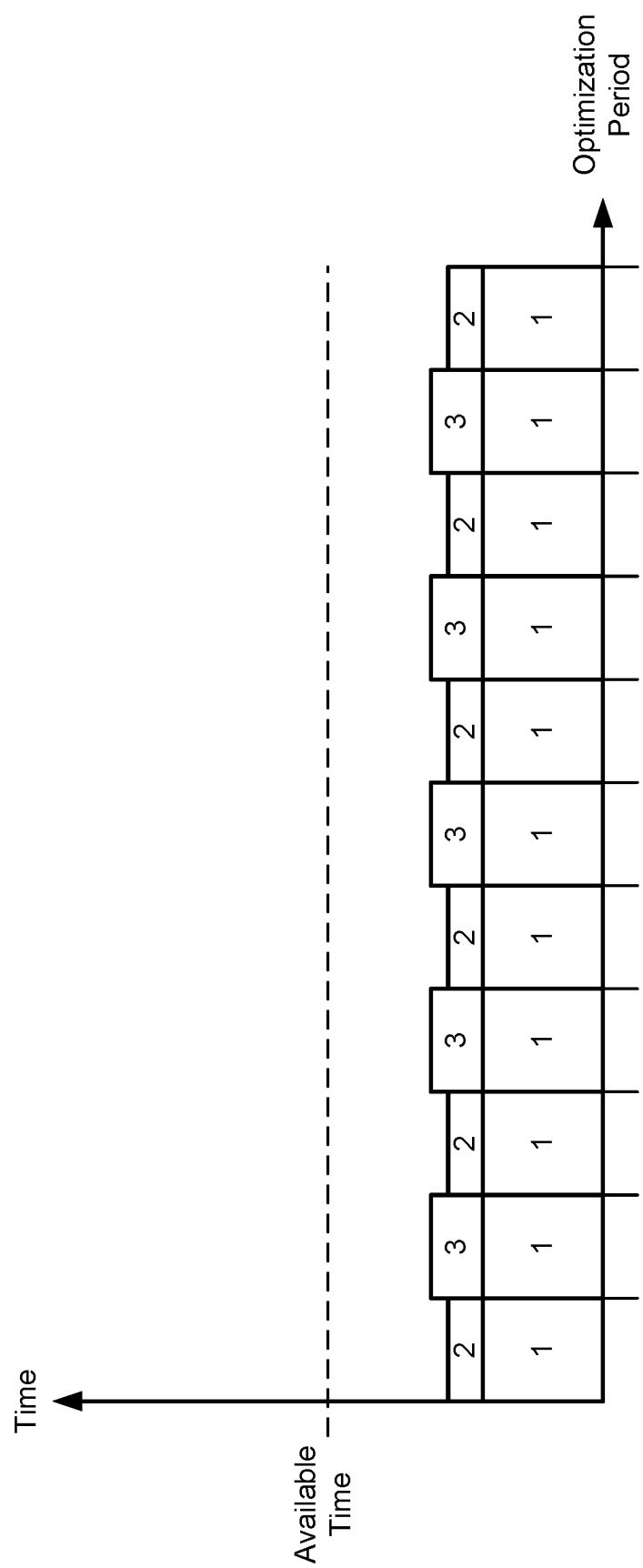
FIG. 4.4

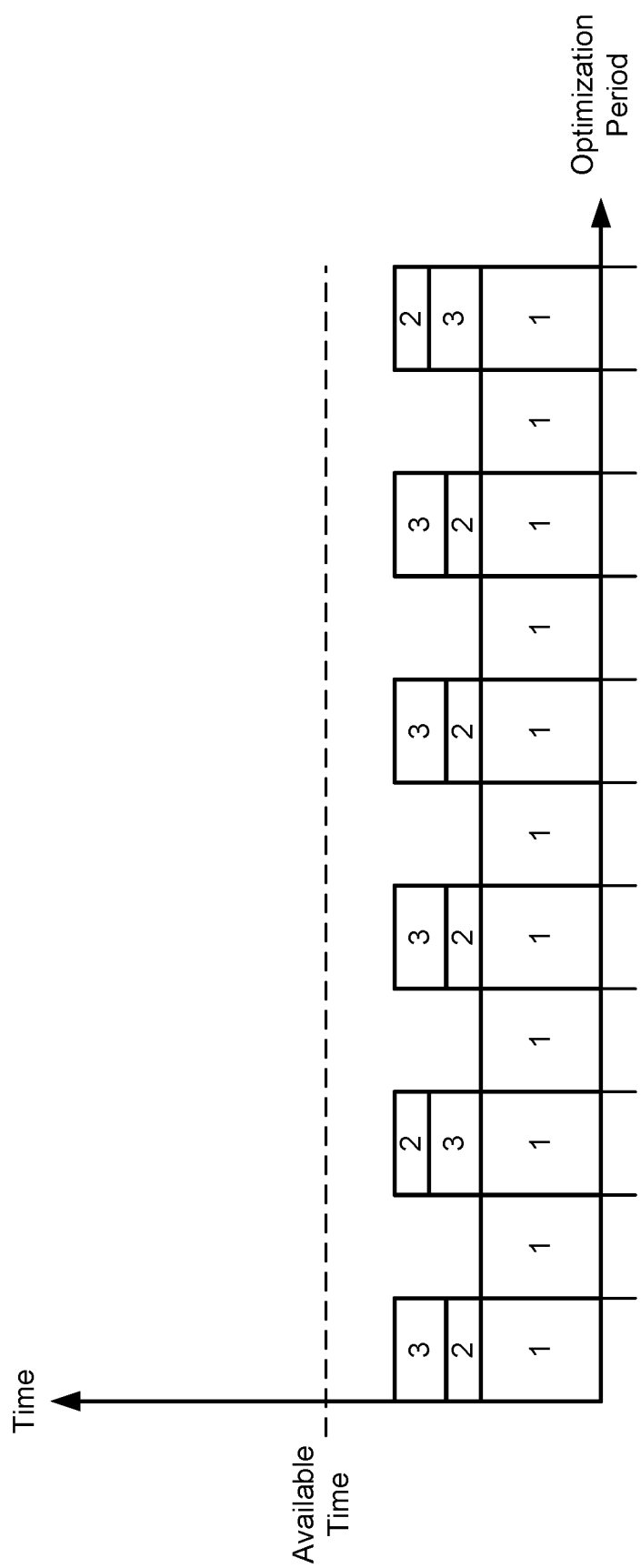
FIG. 4.5

ITERATIVE INTEGER PROGRAMMING WITH LOAD BALANCE FOR CYCLIC WORKLOADS

BACKGROUND

Computing devices may generate data during their operation. For example, applications hosted by the computing devices may generate data used by the applications to perform their functions. Such data may be stored in persistent storage of the computing devices. Failure of the persistent storage may result in data loss.

When data is lost due to device failure, software failure, etc., the data may be unrecoverable if no copies of the data were made and stored in locations other than the persistent storage.

SUMMARY

In one aspect, a backup orchestrator for providing backup services to entities in accordance with one or more embodiments of the invention includes storage for storing recovery point objectives for the entities and a backup manager. The backup manager selects an optimization periodicity based a number of backups to be generated to meet a portion of the recovery point objectives; makes a determination that at least one of the portion of the recovery point objectives has a maximum allowable unbacked up period of time that is greater than the optimization periodicity; in response to the determination: load balances the number of backups across multiple optimization periods, based on the optimization periodicity, of a balanced backup schedule; selects a backup generation time for each of the to be generated backups in each of the optimization periods of the balanced backup schedule; and generates the number of backups using the balanced backup schedule.

In one aspect, a method for providing backup services to entities in accordance with one or more embodiments of the invention includes selecting an optimization periodicity based a number of backups to be generated to meet a portion of recovery point objectives associated with the number of backups; making a determination that at least one of the portion of the recovery point objectives has a maximum allowable unbacked up period of time that is greater than the optimization periodicity; in response to the determination: load balancing the number of backups across multiple optimization periods of a balanced backup schedule demarcated by the optimization periodicity; selecting a backup generation time for each of the to be generated backups in each of the optimization periods of the balanced backup schedule; and generating the number of backups using the balanced backup schedule.

In one aspect, a non-transitory computer readable medium in accordance with one or more embodiments of the invention includes computer readable program code, which when executed by a computer processor enables the computer processor to perform a method for providing backup services to entities. The method includes selecting an optimization periodicity based a number of backups to be generated to meet a portion of recovery point objectives associated with the number of backups; making a determination that at least one of the portion of the recovery point objectives has a maximum allowable unbacked up period of time that is greater than the optimization periodicity; in response to the determination: load balancing the number of backups across multiple optimization periods of a balanced backup schedule demarcated by the optimization periodicity; selecting a backup generation time for each of the to be generated backups in each of the optimization periods of the balanced backup schedule; and generating the number of backups using the balanced backup schedule.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

FIG. 2.1 shows a diagram of an example backup orchestrator in accordance with one or more embodiments of the invention.

FIG. 2.2 shows a diagram of a backup schedule data structure in accordance with one or more embodiments of the invention.

FIG. 3.1 shows a flowchart of a method of generating backups in accordance with one or more embodiments of the invention.

FIG. 3.2 shows a flowchart of a method of load balancing backup generation in accordance with one or more embodiments of the invention.

FIG. 4.1 shows a diagram of a non-limiting example of a system in accordance with embodiments of the invention.

FIGS. 4.2-4.3 show diagrams of a process of identifying backup windows by the system of FIG. 4.1 in accordance with embodiments of the invention.

FIG. 4.4 shows a diagram of an example backup schedule that is load balanced.

FIG. 4.5 shows a diagram of an example backup schedule that is not load balanced.

DETAILED DESCRIPTION

Figure 1:
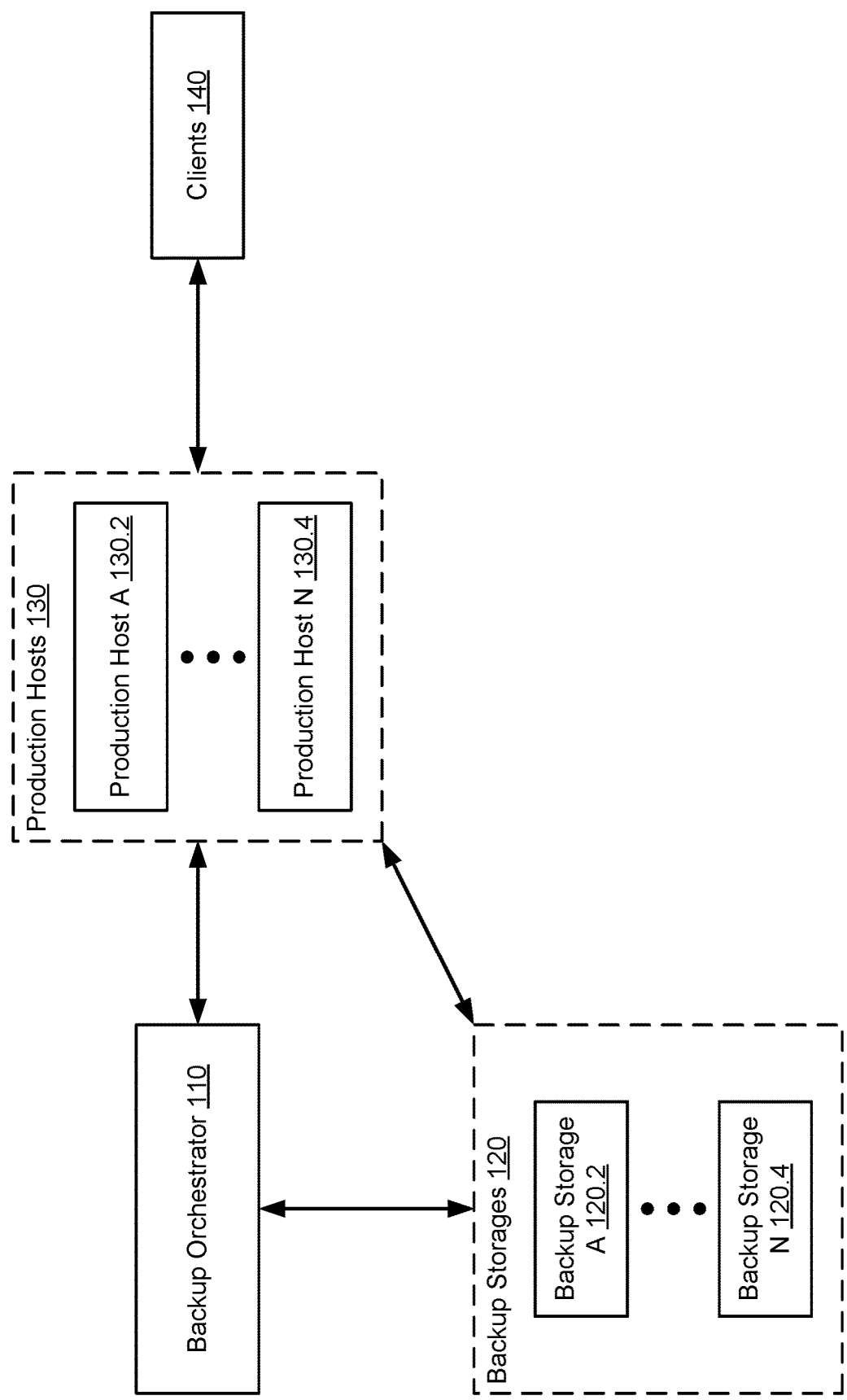
FIG. 1 shows a diagram of a system in accordance with one or more embodiments of the invention.

Specific embodiments will now be described with reference to the accompanying figures. In the following description, numerous details are set forth as examples of the invention. It will be understood by those skilled in the art that one or more embodiments of the present invention may be practiced without these specific details and that numerous variations or modifications may be possible without departing from the scope of the invention. Certain details known to those of ordinary skill in the art are omitted to avoid obscuring the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

In general, embodiments of the invention relate to systems, devices, and methods for providing data protection services in a distributed system. Specifically, embodiments of the invention may provide a system that selects when to generate backups (e.g., a backup schedule) to both meet Recovery Point Objectives (RPOs) while balancing the computational load for generating the backups across time (e.g., load balancing backups). A RPO may specify how frequently backups for an entity must be generated.

To generate the backup schedule, the system may perform a multiphase process that reduces the computational complexity of the problem of generating a backup schedule. Due to the number of variables required to be analyzed to both meet RPOs and load balance backups, a direct optimization problem may be too computationally expensive to reasonably solve.

To avoid the unreasonable optimization problem, the system may separate selecting during which periods of time to generate backups for entities from the process of selecting when, during the periods of time, the backups in each period of time is to be started. By subdividing these processes, the computational cost for generating the backup schedule may be reduced. Consequently, a system in accordance with embodiments of the invention may generate backups in a manner that is less likely to negatively impact other functionalities of the system by load balancing the computational load for generating backups across time. Accordingly, an experience by a user of the system may be improved by reducing the likelihood of the user encountering phantom slow downs or other less desirable behavior of the system due to operations that are unseen to the user.

Consequently, the system may be better able to meet data protection goals that may specify, in part, (i) how long an entity can wait to complete a backup, (ii) how much data of an entity may be in an unbacked up state, and/or (iii) other requirements that specify how and/or when backups should generated.

FIG. 1 shows an example system in accordance with one or more embodiments of the invention. The system may include clients (140) that obtain services from virtual machines and/or applications hosted by production hosts (130). For example, the production hosts (130) may host virtual machines that host applications. The clients (140) may utilize application services provided by the applications. The applications may be, for example, database applications, electronic communication applications, file storage applications, and/or any other type of application that may provide services to the clients (140). By utilizing these services, data that is relevant to the clients (140) may be stored in the production hosts (130).

To improve the likelihood that data stored in the production hosts (130) is available for future use, backups of the production hosts (130) may be generated and stored in the backup storages (120). A backup of one of the production hosts (130) may include data that may be used to restore all, or a portion, of the production host's data, or all, or a portion, of the data used by an entity hosted by the production host, to a previous state. Thus, if data hosted by one of the production hosts (130) is lost, access to the data may be restored by restoring all, or a portion, of the production host's data using information stored in the backup storages (120).

The system may also include a backup orchestrator (110) that provides, in part, data protection services to the production hosts (130). The data protection services may include orchestrating the generation of backups for the production hosts (130), orchestrating storage of the backups in backup storages (120), and/or orchestrating restoration of the production hosts (130) using backups stored in the backup storages (120) and/or other locations.

To orchestrate backup generation and storage, the backup orchestrator (110) may identify periods of time during which the backup storages (120) are likely to be capable of servicing the backup workloads imposed on them by the production hosts (130) during backup generation. At any point in time, the backup storages (120) may be (i) servicing backup workloads and/or (ii) performing other types of tasks. Performing these functions may limit the ability of each of the respective backup storages (120) to service backup workloads.

Additionally, each of the production hosts (130) may be subject to requirements that they only be subject to losing predetermined amounts of data. For example, the clients (140) that utilize the services provided by the production hosts (130) may require that the production hosts only be subject to predetermined amounts of data loss. Consequently, to meet the requirements of the clients (140), the data of the production hosts (130) needs to be backed up in manners consistent with the expectations of the clients (140) and/or other entities so that restoration may be performed to avoid data loss.

For example, the clients (140) may be willing to accept that some amount of data, perhaps the data generated by the production hosts (130) over a predetermined period of time (e.g., a Recovery Point Objective (RPO)), be subject to loss. The clients (140) may not be willing to accept loss of other data such as data of the production hosts that was generated earlier than the predetermined time (e.g., data generated more than 8 hours ago if the clients require that only data generated in the last 8 hours be subject to loss).

However, because the computing resources of the backup storages (120) are limited, backup generation for the production hosts (130) may need to be scheduled. To do so, the backup orchestrator (110) may generate and implement a backup generation schedule. By scheduling backup generations, concurrent backup generation initiation by multiple hosts that would otherwise overwhelm the ability of the backup storages (120) to store backups may be avoided.

To generate the backup schedule, the backup orchestrator (110) take into consideration (i) the likely duration of time required to generate the backups and (ii) the ability of the backup storages (120) to store generated backups. However, generating the backup generation schedule may be a computationally expensive process.

For example, any of the production hosts may host any number of virtual machines that each need to be backed up individually. In turn, the virtual machines may host any number of applications that, similarly, need to be backed up individually. Further, each of the aforementioned entities may be subject to similar or different RPOs. Consequently, determining how to schedule backup generation for these entities may be computationally expensive.

Embodiments of the invention may provide a system that utilizes a method of generating backup schedules that reduces the computational complexity of the aforementioned scheduling scenario. To reduce the computational complexity of the scheduling scenario, the scheduling scenario may be divided into three portions.

In the first portion, a periodicity is identified. The periodicity may specify the period of time during the schedule in which backups may be generated.

In the second portion, the entities for which backups are to be generated during each period are identified. The entities may be identified using an optimization process that distributes the load due to the backup generation over time.

In the third portion, the times during which backups are generated for the entities during each period are identified. In other words, the start times for the backup generation that occur during each time period are identified.

By implementing the aforementioned multiphase process, the time complexity of the scheduling scenario may be reduced from exponential to linear. Consequently, even relatively complicated scheduling scenarios may be addressed in a computationally and/or time efficient manner.

By implementing the above process, embodiments of the invention may improve the quality of backup generation services by improving the likelihood that RPOs are met. For example, by distributing the computational load over time, the likelihood that an expectedly high computational load for generating negatively impacts the backup generation processes may be reduced by improving the availability of computing resources for backup generation.

The components of the system illustrated in FIG. 1 may be operably connected to each other and/or operably connected to other entities (not shown) via any combination of wired and/or wireless networks. Each component of the system illustrated in FIG. 1 is discussed below.

The clients (140) may be implemented using computing devices. The computing devices may be, for example, mobile phones, tablet computers, laptop computers, desktop computers, servers, or cloud resources. The computing devices may include one or more processors, memory (e.g., random access memory), and persistent storage (e.g., disk drives, solid state drives, etc.). The persistent storage may store computer instructions, e.g., computer code, that (when executed by the processor(s) of the computing device) cause the computing device to perform the functions described in this application and/or all, or a portion, of the methods illustrated in FIGS. 3.1-3.2. The clients (140) may be implemented using other types of computing devices without departing from the invention. For additional details regarding computing devices, refer to FIG. 5.

The clients (140) may be implemented using logical devices without departing from the invention. For example, the clients (140) may be implemented using virtual machines that utilize computing resources of any number of physical computing devices to provide the functionality of the clients (140). The clients (140) may be implemented using other types of logical devices without departing from the invention.

In one or more embodiments of the invention, the clients (140) utilize application services provided by the production hosts (130). For example, the clients (140) may utilize database services, electronic communication services, file storage services, or any other type of computer implemented service provided by applications hosted by the production hosts (130). By utilizing the aforementioned services, data that is relevant to the clients (140) may be stored as part of application data of the applications hosted by the production hosts (130).

For example, consider a scenario in which a client utilizes file storage services, provided by an application hosted by the production hosts (130), by uploading an image to an application hosted by the production hosts (130). In response to receiving the uploaded image, the application may store a copy of the image locally in the production hosts (130). At a future point in time, the client that uploaded the image, or another entity, may desire to retrieve a copy of the image from the production hosts (130) and thereby render data, i.e., the copy of the image sort of the production hosts (130), stored in the production hosts (130) to be relevant to the clients (140). One or more embodiments of the invention may improve the likelihood that data that is relevant to the clients (140) and stored in the production hosts (130) is retrievable from the production hosts (130) at future points in time. Embodiments of the invention may provide such functionality by generating and storing backups of the production hosts (130), or a portion of the data of the production hosts, in the backup storages (120).

In one or more embodiments of the invention, the production hosts (130) are implemented using computing devices. The computing devices may be, for example, mobile phones, tablet computers, laptop computers, desktop computers, servers, distributed computing systems, or a cloud resource. The computing devices may include one or more processors, memory (e.g., random access memory), and persistent storage (e.g., disk drives, solid state drives, etc.). The persistent storage may store computer instructions, e.g., computer code, that (when executed by the processor(s) of the computing device) cause the computing device to perform the functions described in this application and/or all, or a portion, of the methods illustrated in FIGS. 3.1-3.2. The production hosts (130) may be implemented using other types of computing devices without departing from the invention. For additional details regarding computing devices, refer to FIG. 5.

In one or more embodiments of the invention, the production hosts (130) are implemented using distributed computing devices. As used herein, a distributed computing device refers to functionality provided by a logical device that utilizes the computing resources of one or more separate and/or distinct physical computing devices. For example, in one or more embodiments of the invention, the production hosts (130) may be implemented using distributed devices that include components distributed across any number of separate and/or distinct computing devices. In such a scenario, the functionality of the production hosts (130) may be performed by multiple, different computing devices without departing from the invention.

The production hosts (130) may be implemented using logical devices without departing from the invention. For example, the production hosts (130) may be implemented using virtual machines that utilize computing resources of any number of physical computing devices to provide the functionality of the production hosts (130). The production hosts (130) may be implemented using other types of logical devices without departing from the invention.

A system in accordance with one or more embodiments of the invention may include any number of production hosts (e.g., 130.2, 130.4) without departing from the invention. For example, a system may include a single production host (e.g., 130.2) or multiple production hosts (e.g., 130.2, 130.4).

In one or more embodiments of the invention, the production hosts (130) provide services to the clients (140). The services may include any type of computer implemented service such as, for example, database services, electronic communication services, data storage services, and/or instant messaging services. When providing such services to the clients (140), data that is relevant to the clients (140) may be stored in persistent storage of the production hosts (130).

In one or more embodiments of the invention, the production hosts (130) provide backup generation services. Backup generation services may include (i) generating backups, and (ii) storing the backups in the identified storage.

The production hosts (130) may provide the backup generation services in accordance with a backup generation schedule maintained by the backup orchestrator (110). For example, the production hosts (130) may initiate backup generation at times specified by the backup generation schedule.

To enable the backup orchestrator (110) to maintain the backup generation schedule, the production hosts (130) may provide the backup orchestrator (110) with RPOs or other information indicating restrictions on their backup generation needs. For example, the production hosts (130) may notify the backup orchestrator (110) of the longest durations of time that the production hosts (130) may continue to generate data without backup up the data. The production hosts (130) may provide the backup orchestrator (110) with additional, less, and/or different information regarding their backup generation needs without departing from the invention.

In one or more embodiments of the invention, the backup storages (120) are implemented using computing devices. The computing devices may be, for example, mobile phones, tablet computers, laptop computers, desktop computers, servers, distributed computing systems, or a cloud resource. The computing devices may include one or more processors, memory (e.g., random access memory), and persistent storage (e.g., disk drives, solid state drives, etc.). The persistent storage may store computer instructions, e.g., computer code, that (when executed by the processor(s) of the computing device) cause the computing device to provide the functionality of the backup storages (120) described through this application and all, or a portion, of the methods illustrated in FIGS. 3.1-3.2. The backup storages (120) may be implemented using other types of computing devices without departing from the invention. For additional details regarding computing devices, refer to FIG. 5.

In one or more embodiments of the invention, the backup storages (120) are implemented using distributed computing devices. As used herein, a distributed computing device refers to functionality provided by a logical device that utilizes the computing resources of one or more separate and/or distinct computing devices. For example, in one or more embodiments of the invention, the backup storages (120) are implemented using distributed devices that include components distributed across any number of separate and/or distinct computing devices. In such a scenario, the functionality of the backup storages (120) may be performed by multiple, different computing devices without departing from the invention.

In one or more embodiments of the invention, the backup storages (120) provide data storage services to the production hosts (130). The data storage services may include storing of data provided by the production hosts (130) and providing of previously stored data to the production hosts (130). Such provided data may be used for restoration (and/or other) purposes. The system may include any number of backup storages (e.g., 120.2, 120.4) without departing from the invention. For example, the system in accordance with embodiments of the invention may only include a single backup storage (e.g., 120.2) or may include multiple backup storages (e.g., 120.2, 120.4).

The backup storages (120) may be limited devices that have a finite quantity of computing resources. Consequently, any of the backup storages (120) may only be able to support a predetermined number of backup generations concurrently. If the predetermined number of supported concurrent backup generations supported by a backup storage is exceeded, the quality of storage services provided by the backup storage may be reduced. For example, storing of a backup may take longer, the storage may need to be paused or otherwise reduced in speed, etc.

If the quality of storage services provided by the backup storages (120) is reduced, assumptions upon which the backup generation schedule is based may be inaccurate. These inaccuracies may result in the system failing to generate backups in a manner consistent with the RPOs of the production hosts (130). Accordingly, the quality of services provided by the production hosts (130) may be reduced due to, for example, unrecoverable data loss.

In one or more embodiments of the invention, the backup orchestrator (110) is implemented using computing devices. The computing devices may be, for example, mobile phones, tablet computers, laptop computers, desktop computers, servers, distributed computing systems, or a cloud resource. The computing devices may include one or more processors, memory (e.g., random access memory), and persistent storage (e.g., disk drives, solid state drives, etc.). The persistent storage may store computer instructions, e.g., computer code, that (when executed by the processor(s) of the computing device) cause the computing device to provide the functionality of the backup orchestrator (110) described through this application and all, or a portion, of the methods illustrated in FIGS. 3.1-3.2. The backup orchestrator (110) may be implemented using other types of computing devices without departing from the invention. For additional details regarding computing devices, refer to FIG. 5.

In one or more embodiments of the invention, the backup orchestrator (110) is implemented using distributed computing devices. As used herein, a distributed computing device refers to functionality provided by a logical device that utilizes the computing resources of one or more separate and/or distinct computing devices. For example, in one or more embodiments of the invention, the backup orchestrator (110) is implemented using distributed devices that include components distributed across any number of separate and/or distinct computing devices. In such a scenario, the functionality of the backup orchestrator (110) may be performed by multiple, different computing devices without departing from the invention.

In one or more embodiments of the invention, the backup orchestrator (110) provides backup orchestration services. Backup orchestration services may include (i) obtaining information regarding the operation of the backup storages (120), the production hosts (130), and/or RPOs or other data storage requirements, (ii) generate a backup generation schedule using a multiphase process, and (iii) initiate backup generations in accordance with the backup generation schedule.

By doing so, the backup orchestrator (110) may facilitate generation of backups in a manner that makes the production hosts (130) and/or other entities for which the backup orchestrator may provide backup orchestration services more likely to comply with RPOs. Thus, the production hosts (130) may be less likely to suffer permanent data loss that negatively impacts their ability to meet the RPOs. For additional details regarding the backup orchestrator (110), refer to FIG. 2.1.

While the system of FIG. 1 has been described and illustrated as including a limited number of components for the sake of brevity, a system in accordance with embodiments of the invention may include additional, fewer, and/or different components than those illustrated in FIG. 1 without departing from the invention.

As discussed above, backup orchestrators may provide backup orchestration services. FIG. 2.1 shows a diagram of the backup orchestrator (110) in accordance with one or more embodiments of the invention. As discussed above, the backup orchestrator (110) may provide backup orchestration services to improve the likelihood of production hosts or other entities to meet RPOs or other data integrity requirements.

To provide the aforementioned functionality of the backup orchestrator (110), the backup orchestrator (110) may include a backup manager (202) and storage (210). Each component of the backup orchestrator (110) is discussed below.

The backup manager (202) may provide backup management services. The backup management services may include (i) obtaining information regarding RPOs, the time required to generate backups for different entities, limitations on where backups may be stored, and/or other types of information that may be used to generate a backup schedule, (ii) generating a backup schedule using the obtained information, and/or (iii) orchestrating generation and storage of backups in accordance with the backup schedule.

When providing its functionality, the backup manager (202) may utilize the storage (210) by storing data structures including information used to generate the backup schedule. For additional details regarding data structures that may be utilized by the backup manager (202) when providing its functionality, refer to FIG. 2.2.

To provide the above noted functionality of the backup manager (202), the backup manager (202) may perform all, or a portion, of the methods illustrated in FIGS. 3.1-3.2.

In one or more embodiments of the invention, the backup manager (202) is implemented using a hardware device including circuitry. The backup manager (202) may be implemented using, for example, a digital signal processor, a field programmable gate array, or an application specific integrated circuit. The backup manager (202) may be implemented using other types of hardware devices without departing from the invention.

In one or more embodiments of the invention, the backup manager (202) is implemented using computing code stored on a persistent storage that when executed by a processor performs all, or a portion, of the functionality of the backup manager (202). The processor may be a hardware processor including circuitry such as, for example, a central processing unit or a microcontroller. The processor may be other types of hardware devices for processing digital information without departing from the invention.

In one or more embodiments disclosed herein, the storage (210) is implemented using devices that provide data storage services (e.g., storing data and providing copies of previously stored data). The devices that provide data storage services may include hardware devices and/or logical devices. For example, storage (210) may include any quantity and/or combination of memory devices (i.e., volatile storage), long term storage devices (i.e., persistent storage), other types of hardware devices that may provide short term and/or long term data storage services, and/or logical storage devices (e.g., virtual persistent storage/virtual volatile storage).

For example, storage (210) may include a memory device (e.g., a dual in line memory device) in which data is stored and from which copies of previously stored data are provided. In another example, storage (210) may include a persistent storage device (e.g., a solid state disk drive) in which data is stored and from which copies of previously stored data is provided. In a still further example, storage (210) may include (i) a memory device (e.g., a dual in line memory device) in which data is stored and from which copies of previously stored data are provided and (ii) a persistent storage device that stores a copy of the data stored in the memory device (e.g., to provide a copy of the data in the event that power loss or other issues with the memory device that may impact its ability to maintain the copy of the data cause the memory device to lose the data).

The storage (210) may store data structures including a backup constraints repository (212) and a backup schedule repository (214). Each of these data structures is discussed below.

The backup constraints repository (212) may include one or more data structures that include information regards constraints on when backups may be generated for entities and/or where the backups may be stored (e.g., stored in which backup storage). For example, the backup constraints repository (212) may include RPOs for each of the entities that are to be included in one or more backup schedules. The RPOs may specify, for example, the maximum duration that a device is allowed to operate without a backup being generated. In other words, how much data over a period of time is subject to loss due to unrecoverable data loss (e.g., not backed up).

The backup constraints repository (212) may also include information regarding deduplication or other architectures upon which the to be backed up entities rely that place constraints on where data may be stored. For example, to deduplicate data, data is typically stored in the same storage system that includes the data against which the new data is to be deduplicated against. By having access to the data in the same location in which it is going to be stored, the computational cost for performing the deduplication can be greatly reduced when compared with trying to deduplicate against data stored in a remote storage system.

The backup constraints repository (212) may also include information regarding the computational capabilities of the backup storages. The computational capabilities of the backup storages may be used to identify how many backup generation sessions a backup storage can support over time (e.g., can only support 1 session at any point in time, 2 concurrent sessions, etc.). Additionally, the computational capabilities of the backup storages may be used to ascertain, for example, how long it will take the backup storages to complete a backup generation session (e.g., based on the estimated quantity of data included in a backup).

The backup constraints repository (212) may also include information regarding characteristics of other portions of the system that may be used to facilitate generating backup schedules. For example, the communication bandwidth between the backup storages and entities that will provide backups may be used to ascertain whether the storage capabilities of the backup storages will be limited by the network environment of the system (in contrast to hardware limitations of the backup storage itself). The aforementioned information may be used to obtain estimates of the backup generation and storage times for completing generation and storage of backups, respectively.

The backup schedule repository (214) may include one or more data structures that include information regarding backup schedules (also referred to as backup generation schedules). Backup schedules may be data structures that specify at which points in time backups for entities are to be generated (e.g., generate a backup for device #1 at 8:00 AM) and where the generated backups are to be stored (e.g., backup storage #14).

The backup schedules may be generated by the backup manager (202) based on the information included in the backup constraints repository (212). Once generated, the backup manager (202) may use the backup schedules to manage (e.g., orchestrate) the generation and storage of backups in backup storages. For example, the backup manager (202) may send messages to various entities for which backups are to be generated that indicate that the entities should (i) generate backups at specific times and (ii) store the generated backups in particular locations (e.g., particular backup storages). For additional details regarding backup schedules, refer to FIG. 2.2.

While the data structures stored in storage (210) have been described as including a limited amount of specific information, any of the data structures stored in storage (210) may include additional, less, and/or different information without departing from the embodiments disclosed herein. Further, the aforementioned data structures may be combined, subdivided into any number of data structures, may be stored in other locations (e.g., in a storage hosted by another device), and/or spanned across any number of devices without departing from the embodiments disclosed herein. Any of these data structures may be implemented using, for example, lists, table, linked lists, databases, or any other type of data structures usable for storage of the aforementioned information.

While the backup orchestrator (110) of FIG. 2.1 has been described and illustrated as including a limited number of components for the sake of brevity, a backup orchestrator in accordance with embodiments of the invention may include additional, fewer, and/or different components than those illustrated in FIG. 2.1 without departing from the invention.

As discussed above, the backup orchestrator (110) may utilize data structures to provide its functionality. FIG. 2.2 shows a diagram of a data structure that may be used by the backup orchestrator (110) when providing its functionality.

FIG. 2.2 shows a diagram of a backup schedule (220) data structure in accordance with one or more embodiments of the invention. As discussed above, the backup schedule (220) may include information regarding when backups are to be generated and where the backups are to be stored.

In one or more embodiments of the invention, the backup schedule (220) include any of number entries (e.g., 222, 230). Each of the entries may include a production host identifier (224), a backup storage identifier (226), and a backup generation time (228).

The production host identifier (224) may identify the production host for which a backup is to be generated. In other words, for which the backup orchestrator (110) is providing backup generation services The backup storage identifier (226) may identify the backup storage in which a backup that will be generated for the production host identified by the production host identifier (224) is going to be stored.

The backup generation time (228) may specify one or more points in time at which backups of the production host identified by the production host identifier (224) is going to be generated. For example, the backup generation time (228) may specify 1:30 PM on Tuesday, 1:30 PM every day, etc.

The aforementioned portions of each entry may form a tuple that associate a production host, backup storage, and backup generation time. The backup orchestrator (110) may, as will be discussed in greater detail below, select each of these components of the tuple during the process of generating a backup schedule.

While the backup schedule (220) has been described as including a limited amount of specific information, the backup schedule (220) may include additional, less, and/or different information without departing from the embodiments disclosed herein. Further, the backup schedule (220) may be combined, subdivided into any number of data structures, may be stored in other locations (e.g., in a storage hosted by another device), and/or spanned across any number of devices without departing from the embodiments disclosed herein. Additionally, while described as being implemented using a list of entries (222, 230), the backup schedule (220) may be implemented using different types of data structures (e.g., databases, linked lists, tables, etc.) without departing from the invention.

Returning to FIG. 1, the backup orchestrator (110) may provide backup orchestration services for the production hosts (130) and/or other devices not illustrated in FIG. 1. FIGS. 3.1-3.2 illustrate methods that may be performed by the backup orchestrator (110) of the system of FIG. 1 when providing backup orchestration services.

FIG. 3.1 shows a flowchart of a method in accordance with one or more embodiments of the invention. The method depicted in FIG. 3.1 may be used to generate backups in accordance with one or more embodiments of the invention. The method shown in FIG. 3.1 may be performed by, for example, a backup orchestrator (e.g., 110, FIG. 1). Other components of the system illustrated in FIG. 1 may perform all, or a portion, of the method of FIG. 3.1 without departing from the invention.

While FIG. 3.1 is illustrated as a series of steps, any of the steps may be omitted, performed in a different order, additional steps may be included, and/or any or all of the steps may be performed in a parallel and/or partially overlapping manner without departing from the invention.

In step 300, an optimization periodicity is selected. The optimization periodicity may be selected based on a number of backups that must be generated to meet RPOs and/or other types of criteria.

An optimization periodicity may be a unit of time used to divide the duration of time for which a backup schedule is to be generated. For example, if the backup schedule is to be for the next 30 days, the optimization periodicity may be a duration of time less than 30 days. The optimization periodicity may be, for example, 1 hour, 4 hours, 12 hours, 24 hours, 48 hours, 72 hours, 1 week, etc.

The optimization periodicity may be used to divide the backup schedule into periods during which optimization may occur. For example, if the backup schedule is 30 days in duration and the optimization periodicity is 12 hours, the backup schedule may be divided into 60 separate periods.

To select the optimization periodicity, the RPOs and/or other types of criteria may be analyzed to determine a maximum optimization periodicity. The maximum optimization periodicity may be the smallest duration of time which the RPOs and/or or other criteria allow. In other words, the maximum optimization periodicity may not exceed the duration of the shortest time in which data loss is allowed. For example, if the shortest period of time required by the RPOs is 6 hours, the optimization periodicity may be set to a period of time up to six hours in duration.

In one or more embodiments of the invention, the optimization periodicity is selected to be the shortest acceptable data loss time period required by the RPOs. For example, if the shortest period of time required by the RPOs is 6 hours, the optimization periodicity may be set to six hours in duration. By setting the optimization time period to the maximum allowable, the complexity of the process of generating the backup schedule may be reduced. As will be discussed below, larger numbers of periods of time in which backups may be performed may have progressively increasing computational cost for selecting the backups to be generated during each period.

In step 302, an optimization granularity is selected. The optimization granularity may be a period of time used to divide the periods, discussed with respect to step 302, into sub portions. In other words, if a period has a duration of 12 hours, the optimization granularity may define how the 12 hour duration is broken down into sub-portions. If the period is 12 hours and the optimization granularity is 15 minutes, the period is divided into 48 hour 15 minute sub-portions. As will be discussed in greater detail below, the backup schedule may specify that a backup generation is to begin during any of the sub-portions and extend through any number of portions (depending on the estimated duration of performing the backup).

The optimization granularity may be selected based on a complexity of the optimization and the computing resources available to perform the optimization. Generally, the computational complexity of generating the backup schedule depends on the numbers of sub-portions during which a backup generation could start. In other words, the larger numbers of sub-portions the larger number of variables need to be evaluated to obtain the backup schedule.

To select the optimization granularity, the computational complexity generating the backup schedule may be evaluated in view of the computational resources available to the backup orchestrator. The optimization granularity may be reduced in duration if the backup orchestrator includes large quantities of computing resources that may be used to generate the backup schedule. In contrast, the optimization granularity may be increased in duration if the backup orchestrator includes smaller quantities of computing resources. Generally, reducing the optimization granularity in duration leads to better optimized backup schedules while increasing the optimization granularity in duration leads to more poorly optimized backup schedules by virtue of the reduced periods of time in which backup generations may be initiated.

In step 304, it is determined whether any RPOs or other criteria have a maximum allowable unbacked up time that is greater than the optimization periodicity. If any of the RPOs have a maximum allowable unbacked up time that is greater than the optimization periodicity, then the method proceeds to step 306. Otherwise, the method proceeds to step 312.

In other words, the decision made in step 304 reflects whether all of the backups need to be generated in each period or some of the backups only need to be generated during some of the periods of the backup schedule. For example, if a backup only needs to be generated every 48 hours for an entity and a backup schedule has been divided into 12 hour time periods, the backup could be generated in every other period while still meeting RPOs and/or other types of criteria.

In step 306, the backups are load balanced across periods of a balanced backup schedule.

As used herein, a balanced backup schedule refers to a backup schedule in which it is has been determined that backups for all of the entities for which backup services are being provided do not need to be generated in each time period, as clarified by way of example in the paragraph preceding the initial discussion of step 306.

The backups may be load balanced across the periods by identifying in which each period a backup for an entity is to be generated. The result of load balancing is a list of periods and corresponding identities for which backups are to be generated during the respective periods. Load balancing does not include identifying the specific periods of time in each period (e.g., which sub-portions the backup generation occupies) in which the backups that h) during which the backups are generated.

In one or more embodiments of the invention, the backups are balanced by distributing them across the periods of the balanced backup schedule in a manner consistent with the RPOs. The backups may be further balanced across the periods of the balanced backup schedule in a manner consistent with distributing the computational load for generating the backups across the periods. In other words, the backups may be balanced by placing them in each period in a manner that causes each period to include backups that have approximately the same aggregate computational load. By doing so, the computational load for generating backups may also be efficiently distributed in time. Consequently, the other functionalities of the production hosts and/or the backup storages are less likely to be negatively impacted by the computational load imposed for backup generation.

In one or more embodiments of the invention, the backups are balanced by solving an optimization problem. For example, an integer programming problem may be formulated based on the above constraints to provide backup balancing.

In one or more embodiments of the invention, the integer programming problem may solve for the start time of each backup generation during the periods of the backup schedule. The start times for each backup generation may be constrained to the granular time periods defined by the optimization periodicity and optimization granularity, discussed above.

In one or more embodiments of the invention, the backups are load balanced using the method illustrated in FIG. 3.2. The backups may be load balanced using other methods without departing from the invention.

In step 308, a backup generation time for each backup specified as being to be generated during each period of the backup schedule is selected. In other words, after the backups to be generated during each period is selected, the start times of each backup generation in each period of time is identified.

In one or more embodiments of the invention, the backup generation time for each backup specified as being to be generated during each period of the backup schedule is selected using an optimization problem. The optimization problem may include constraints based on RPOs, estimated times for generating backups, and/or other factors. The optimization problem may be formulated with an objective function that may be solved using any method without departing from the invention. The result of solving the optimization problem may be to place each of the backup generations in each period into different available time slots within each respective period.

The selected backup generation times may be used to generate the backup generation schedule. For example, a list as described with respect to FIG. 2.2 may be generated to reflect each backup generation that will be performed.

In step 310, backups are generated using the backup schedule. The backups may be generated by orchestrating backup generations in accordance with the backup schedule. For example, each of the production hosts may be instructed to generate backups at predetermined times and store them in corresponding backup storages.

The method may end following step 310.

Returning to step 304, the method may proceed to step 312 following step 304 when none of the RPOs, associated with the entities for which backups will be generated, have a maximum allowable unbacked up time that is greater than the optimization periodicity.

In step 312, each backup is added to each period of an unbalanced backup schedule.

As used herein, an unbalanced backup schedule refers to a backup schedule in which it is has been determined that backups for all of the entities need to be generated in each time period, as clarified by way of example in the paragraph preceding the initial discussion of step 306.

Each backup may be added to each period of the unbalanced backup schedule by indicating that a backup for each entity for which backup services are being provided needs to be generated during each period.

The method may proceed to step 308 following step 312.

Using the method illustrated in FIG. 3.1, backups may be generated in a manner that ensures that RPOs and other criteria are may while also reducing the computational impact on the system. By distributing the backup generations in time, the peak load imposed on each portion of the system may be reduced. Consequently, the other functionalities of the portions of the system may be less likely to be negatively impacted by the backup generations.

FIG. 3.2 shows a flowchart of a method in accordance with one or more embodiments of the invention. The method depicted in FIG. 3.2 may be used to load balance backups in accordance with one or more embodiments of the invention. The method shown in FIG. 3.2 may be performed by, for example, a backup orchestrator (e.g., 110, FIG. 1). Other components of the system illustrated in FIG. 1 may perform all, or a portion, of the method of FIG. 3.2 without departing from the invention.

While FIG. 3.2 is illustrated as a series of steps, any of the steps may be omitted, performed in a different order, additional steps may be included, and/or any or all of the steps may be performed in a parallel and/or partially overlapping manner without departing from the invention.

In step 320, an optimization problem that constrains the period of a balanced backup schedule in which each backup is to be generated is setup. The optimization problem may be formulated to enable it to be solved on a computer. For example, an integer programming problem may be formulated as the optimization problem. Other types of optimization problems may be used without departing from the invention.

The optimization problem may be constrained based on (i) the RPOs of each entity, (ii) the estimated backup generation durations for the entities for which backup services are going to be provided, (iii) a limit on the total duration for backup generation associated with each backup storage during each period, and (iv) a limit on which backup storages can be used to store backups for each entity. Each of these constraints is discussed below.

The RPOs may indicate how frequently backups for each entity for which backup services are being provided need to be generated to meet the RPOs. For example, the RPOs may specify that up to a predetermined duration of time may occur without a backup for an entity being generated. The aforementioned predetermined duration of time may specify how frequently backups need to be generated during the time periods of the backup generation schedule.

The estimated backup generation durations for the entities may indicate how computationally/time expensive it is to generate each backup. This constraint may prevent the optimization problem from allowing backups to be schedule for periods of time during which other backups are likely to be generated. Because the backup storages and/or other portions of the system have limited computational resources, concurrent generation and/or storage of multiple backups may not be able to be performed.

The limit on the total duration for backup generation associated with each backup storage may place a constraint on the optimization problem that balances the backups across the periods. For example, the limit may specify that each period need to include approximately the same computational load due to backup generation in each period.

The limit on which backup storages can be used to store backups for each entity may place a constraint on the optimization problem that prevents backups for an entity to be stored in different backup storages. For example, after a first backup for an entity is stored in a backup storage, the constraint may require that all future backups for the entity be stored in the same backup storage. By doing so, higher deduplication ratios may be achieved by aggregating data that is likely to be similar to previously stored in the same backup storages that perform deduplication against previously stored data.

In one or more embodiments of the invention, the optimization problem is formulated using the follow set of equations:

$$\min l_{max} + \Sigma_{j \in J} \Sigma_{w=1}^{TW} x_j^w \quad (1)$$

$$s.t. \Sigma_{k=w}^{w+F_j} x_j^k \geq 1 \, \forall j \in J, \forall w \in [1, TW-F_j] \quad (2)$$

$$l_w = \Sigma_{j \in J} T_j x_j^w \, \forall w \in [1, TW] \quad (3)$$

$$l_{max} \geq l_w \, \forall w \in [1, TW] \quad (4)$$

$$l_w \in R^+ \forall w \in [1, TW] \quad (5)$$

$$l_{max} \in R^+ \forall w \in [1, TW] \quad (6)$$

$$x_j^w \in \{0,1\} \forall j \in J, \forall w \in [1, TW] \quad (7)$$

where $x_j^w$ are the variables to be solved by the optimization problem and represent whether a backup for a particular entity, j, is to be performed in period, w, of a backup schedule. The value of each of the binary variables, i.e., 1 or 0, represents whether the backup for the entity will be generation (i.e., value of 1) or will not be performed (i.e., 0).

TW in the above equations represents the total duration of the backup schedule in terms of periods. $L_w$ constrains the optimization problem so that the total computational load in each period is approximately the same as in other periods by summing the total estimated backup generation time during each period. $L_{max}$ also constrains the optimization problem so that the total computational load in each period is approximately equal.

To constrain the RPO requirements, $F_j$ represents how frequently a backup for each entity j needs to be generated.

To solve the above system of equations, the objective function $1_{max} + \Sigma_{j \in J} \Sigma_{w=1}^{TW} x_j^w$ is minimized. The resulting values for $x_j^w$ specify whether a backup is generated for each entity during each period of the backup generation schedule.

In step 322, the optimization problem of step 320 is solved to obtain a backup periodization that specifies which backups are to be generated during each period (e.g., optimization period) of the balanced backup generation schedule. In other words, the objective function discussed above may be minimized to obtain a list of the backups to be generated during each period. The specific time at which each backup is to be generated in each period may not be known at this point in time.

By decoupling the aforementioned optimization problem from that of determining during which period of time in each period to initiate a backup generation may reduce the computational complexity of the problem to be solvable using reasonable computing resources. If the aforementioned problems are not decoupled from one another, the computational complexity may be unreasonable.

In step 324, the backups are added to the respective periods of the balanced backup schedule based on the backup periodization. In other words, the list of step 322 may be used to indicate in which periods backups for the entities are to be generated.

The method may end following step 324.

Using the method illustrated in FIG. 3.2, balanced backup schedules may be generated in a manner that is computationally reasonable. Consequently, backup schedules may be implemented that provide for load balancing of backup generations across time to prevent excessive peak computing resource consumption while also meeting RPO, deduplication, backup storage limitations, and/or other constraints.

To further clarify embodiments of the invention, a non-limiting example is provided in FIGS. 4.1-4.5. FIG. 4.1 shows a diagram of an example system similar to that of FIG. 1. FIGS. 4.2-4.3 illustrate interactions between components and/or actions performed by the components of the system of FIG. 4.1 over time. FIG. 4.4 shows a diagram of the resulting backup schedule generated by the system of FIG. 4.1. FIG. 4.5 shows a diagram of a backup schedule that could occur if the system of FIG. 4.1 did not perform all of the methods of FIGS. 3.1-3.2. For the sake of brevity, only a limited number of components of the system of FIG. 1 are illustrated in each of FIGS. 4.1-4.3.

EXAMPLE

Consider a scenario as illustrated in FIG. 4.1 in which a backup orchestrator (406) is providing backup services to three production hosts (e.g., 400, 402, 404). At the point in time illustrated in FIG. 4.1, the backup orchestrator (406) may need to decide how to provide backup services to the production hosts.

Turning to FIGS. 4.2-4.3, the aforementioned figures illustrate interactions and actions between components of the system of FIG. 4.1. In these figures, the relative occurrence in time of the interactions progresses from the top of each figure (i.e., earlier in time) to the bottom of each figure (i.e., later in time). FIG. 4.3 is a continuation of the diagram of FIG. 4.2. In other words, element 410 indicates the first interaction that occurs in time while element 430 indicates the last interaction that occurs.

To determine when backups are to be generated for the production hosts, the backup orchestrator (406) obtains backup requirements (410, 412, 414) from the respective production hosts. These backup requirements may include RPO requirements. The first production host (400) has a RPO requirement of 24 hours while the second production host (402) and their production host (404) both have RPOs of 24 hours.

Using the backup requirements (410, 412, 414), the backup orchestrator (406) identifies an optimization period (416) of every 24 hours. In other words, the smallest RPO requirement of the production hosts.

After identifying the optimization period, the backup orchestrator (406) identifies a RPO requirement of the backup requirements exceeds the optimization period. In other words, the backup orchestrator (406) identifies that the RPOs of the second production host (402) and the third production host (404) are both longer induration than the optimization period. Consequently, the backup orchestrator (406) determines that a balanced backup schedule should be used to generate the backup schedule.

In response to the determination, the backup orchestrator (406) obtains a balanced backup schedule, as discussed with respect to FIG. 3.2. Returning to FIG. 4.2, the backup orchestrator (406) then solves a second optimization problem to select backup generation times in each optimization period (422). The aforementioned backup generation times are then used to generate the backup generation schedule. Specifically, the backup orchestrator (406) generates a backup generation schedule as illustrated in FIG. 4.3.

Turning to FIG. 4.3, the backup orchestrator (406) sends backup generation requests (424) to the production hosts. The backup generation requests (424) specify (i) when to generate backups and (ii) where to store the backups (e.g., which backup storages). The aforementioned requests are made in accordance with the backup schedule.

Turning to FIG. 4.5, FIG. 4.5 shows a diagram of the backup schedule generated by the backup orchestrator (406). In FIG. 4.5, a two dimension plot is shown. The horizontal axis represents optimization periods during the backup schedule. Each of the optimization periods are demarcated by ticks along the axis. The vertical axis represents the time during each optimization period.

In the plot, the start time and duration of backup generations are illustrated by boxes within the plot. The numbers included in each of the boxes indicate for which backup storage (e.g., first, second, third) a backup is to be generated.

For example, in the first optimization period illustrated in the far left portion of the figure, the backup schedule specifies that a first backup is to be generated for the first production host at the start of the optimization period (as indicated by the box labeled 1). Once the backup is complete, a backup of the second production host is to be performed (as indicated by the box labeled 2).

In the second optimization period, illustrated just to the right of the first optimization period, the backup schedule specifies that a first backup is to be generated for the first production host at the start of the optimization period (as indicated by the box labeled 1). Once the first backup is complete, a backup of the third production host is to be performed (as indicated by the box labeled 3).

The aforementioned process repeats, cyclically across the optimization periods.

By balancing backups across the optimization periods, the computational load on the system is distributed across time.

However, if the backup generations were not balanced, they may place a great load on the system. For example, consider a scenario as illustrated in FIG. 4.5 which shows a diagram of a backup schedule that could be implemented without balancing as provided herein. As seen in FIG. 4.5, rather than distribute backups across time, the backups are aggregated in different optimization periods.

For example, the first optimization periods, backups for all three production hosts are generated. In contrast, a backup of only the first production host is performed in the second optimization period.

This resulting backup schedule may meet all of the RPO requirements. However, it results in unnecessary loading of the system for backup generation purposes. For example, during the first optimization period the system may have a much greater difficulty in providing its other functionalities because of the large number of backup generations during the period of time.

End of Example

Figure 5:
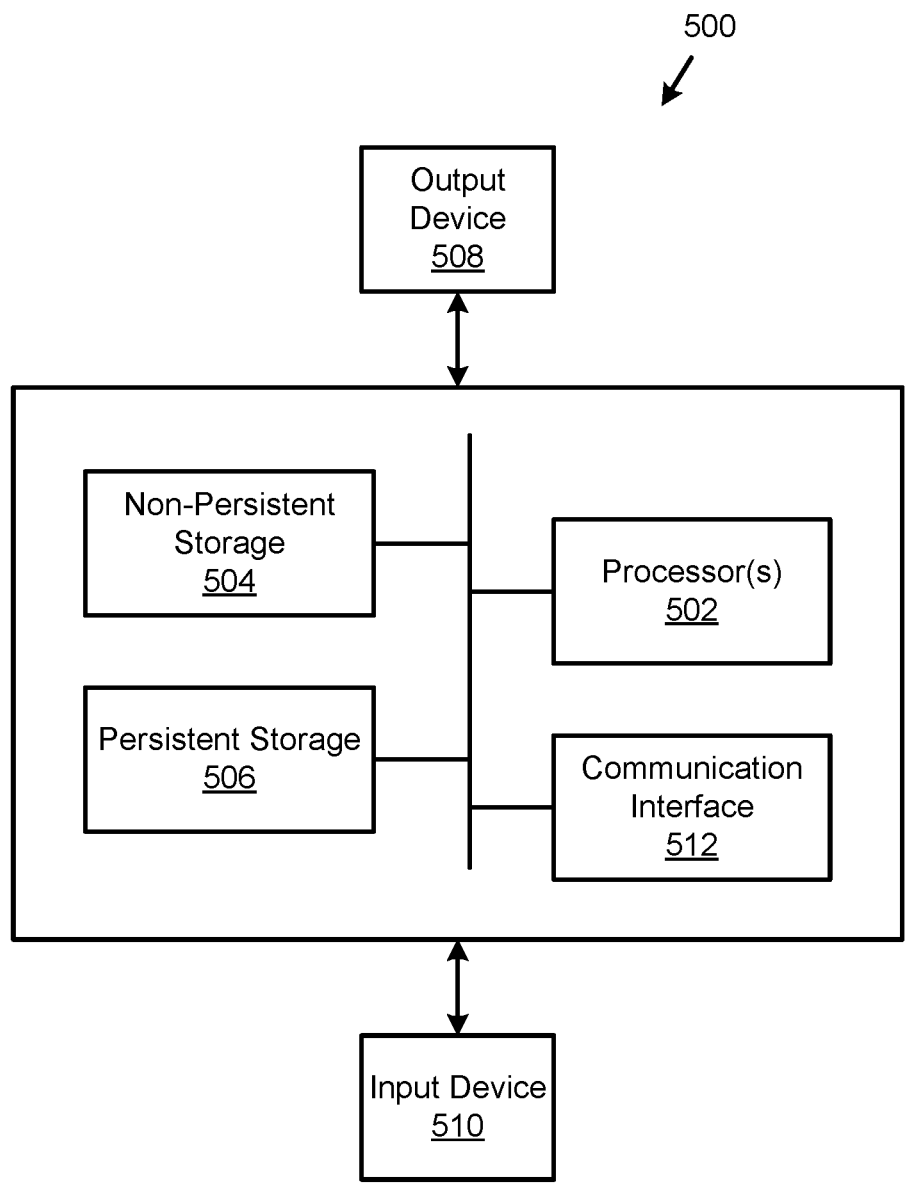
FIG. 5 shows a diagram of a computing device in accordance with one or more embodiments of the invention.

Any of the components of FIG. 1 may be implemented as distributed computing devices. As used herein, a distributed computing device refers to functionality provided by a logical device that utilizes the computing resources of one or more separate and/or distinct computing devices. As discussed above, embodiments of the invention may be implemented using computing devices. FIG. 5 shows a diagram of a computing device in accordance with one or more embodiments of the invention. The computing device (500) may include one or more computer processors (502), non-persistent storage (504) (e.g., volatile memory, such as random access memory (RAM), cache memory), persistent storage (506) (e.g., a hard disk, an optical drive such as a compact disk (CD) drive or digital versatile disk (DVD) drive, a flash memory, etc.), a communication interface (512) (e.g., Bluetooth interface, infrared interface, network interface, optical interface, etc.), input devices (510), output devices (508), and numerous other elements (not shown) and functionalities. Each of these components is described below.

In one embodiment of the invention, the computer processor(s) (502) may be an integrated circuit for processing instructions. For example, the computer processor(s) may be one or more cores or micro-cores of a processor. The computing device (500) may also include one or more input devices (510), such as a touchscreen, keyboard, mouse, microphone, touchpad, electronic pen, or any other type of input device. Further, the communication interface (512) may include an integrated circuit for connecting the computing device (500) to a network (not shown) (e.g., a local area network (LAN), a wide area network (WAN) such as the Internet, mobile network, or any other type of network) and/or to another device, such as another computing device.

In one embodiment of the invention, the computing device (500) may include one or more output devices (508), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (502), non-persistent storage (504), and persistent storage (506). Many different types of computing devices exist, and the aforementioned input and output device(s) may take other forms.

Embodiments of the invention may provide a system that generates backups in a manner that reduces the likelihood of negatively impacting other functionalities of the system. Specifically, embodiments of the invention may provide a method of balancing the computational load imposed by generating backups on the system across time while still meeting RPOs. By doing so, users of the system may be less likely to encounter phantom slowdowns or other behavior that is perceived as frustrating to users or impedes the ability of the system to provide its functionality.

Thus, embodiments of the invention may address the problem of the limited availability of computational resources in a distributed system that relies on data redundancy for data protection purposes. Specifically, embodiments of the invention may provide a method of distributing workloads in a manner that prevents or reduces the likelihood of backup generations negatively impacting other functionalities of the system.

The problems discussed above should be understood as being examples of problems solved by embodiments of the invention disclosed herein and the invention should not be limited to solving the same/similar problems. The disclosed invention is broadly applicable to address a range of problems beyond those discussed herein.

One or more embodiments of the invention may be implemented using instructions executed by one or more processors of the data management device. Further, such instructions may correspond to computer readable instructions that are stored on one or more non-transitory computer readable mediums.

While the invention has been described above with respect to a limited number of embodiments, those skilled in the art, having the benefit of this disclosure, will appreciate that other embodiments can be devised which do not depart from the scope of the invention as disclosed herein. Accordingly, the scope of the invention should be limited only by the attached claims.

What is claimed is:

1. A backup orchestrator for providing backup services to entities, comprising:
   storage for storing recovery point objectives for the entities;
   a processor; and
   a backup manager implemented using computing code executed by the processor, the backup manager is programmed to:
      select an optimization periodicity based on a number of backups to be generated to meet a portion of the recovery point objectives;
      make a determination that at least one of the portion of the recovery point objectives has a maximum allowable unbacked up period of time that is greater than the optimization periodicity;
      in response to the determination:
         load balance the number of backups across multiple optimization periods, based on the optimization periodicity, of a balanced backup schedule, wherein load balancing the number of backups across multiple optimization periods comprises:
            constraining the number of backups to placement across the multiple optimization periods based on, in part, a limit on a total duration for backup generation during each of the multiple optimization periods to obtain a backup periodization of the number of backups; and
            adding backups of the number of backups to the respective periods of the balanced backup schedule based on the backup periodization;
         select a backup generation time for each of the to be generated backups in each of the optimization periods of the balanced backup schedule; and
         generate the number of backups using the balanced backup schedule.

2. The backup orchestrator of claim 1, wherein the backup manager is further programmed to:
   select a second optimization periodicity based on a second number of backups to be generated to meet a second portion of the recovery point objectives;
   make a determination that none of the second portion of the recovery point objectives has a maximum allowable unbacked up period of time that is greater than the second optimization periodicity;
   in response to the determination:
      add each backup to each optimization period of an unbalanced backup schedule;
      select a backup generation time for each of the second number of backups in each of the optimization periods of the unbalanced backup schedule; and
      generate the second number of backups using the unbalanced backup schedule.

3. The backup orchestrator of claim 1, wherein the placements of the number of backups are further constrained based, in part, on a second limit on which backup storages, used to store the number of backups, can store the number of backups.

4. The backup orchestrator of claim 3, wherein the second limit is adapted to aggregate a portion of the number of backups that are likely to include data that is duplicative of existing data stored in a backup storage of the backup storages.

5. The backup orchestrator of claim 1, wherein the placements of the number of backups are further constrained based, in part, on times required to generate the number of backups.

6. The backup orchestrator of claim 1, wherein the placements of the number of backups are further constrained based, in part, on maximum allowable unbacked up periods of time for the number of backups.

7. A method for providing backup services to entities, comprising:
  selecting an optimization periodicity based on a number of backups to be generated to meet a portion of recovery point objectives associated with the number of backups;
  making a determination that at least one of the portion of the recovery point objectives has a maximum allowable unbacked up period of time that is greater than the optimization periodicity;
  in response to the determination:
    load balancing the number of backups across multiple optimization periods of a balanced backup schedule demarcated by the optimization periodicity, wherein the load balancing comprises:
      constraining the number of backups to placement across the multiple optimization periods based on, in part, a limit on a total duration for backup generation during each of the multiple optimization periods to obtain a backup periodization of the number of backups; and
      adding backups of the number of backups to the respective periods of the balanced backup schedule based on the backup periodization;
    selecting a backup generation time for each of the to be generated backups in each of the optimization periods of the balanced backup schedule; and
    generating the number of backups using the balanced backup schedule.

8. The method of claim 7, further comprising:
  selecting a second optimization periodicity based on a second number of backups to be generated to meet a second portion of the recovery point objectives;
  making a determination that none of the second portion of the recovery point objectives has a maximum allowable unbacked up period of time that is greater than the second optimization periodicity;
  in response to the determination:
    adding each backup to each optimization period of an unbalanced backup schedule;
    selecting a backup generation time for each of the second number of backups in each of the optimization periods of the unbalanced backup schedule; and
    generating the second number of backups using the unbalanced backup schedule.

9. The method of claim 7, wherein the placements of the number of backups are further constrained based, in part, on a second limit on which backup storages, used to store the number of backups, can store the number of backups.

10. The method of claim 9, wherein the second limit is adapted to aggregate a portion of the number of backups that are likely to include data that is duplicative of existing data stored in a backup storage of the backup storages.

11. The method of claim 7, wherein the placements of the number of backups are further constrained based, in part, on times required to generate the number of backups.

12. The method of claim 7, wherein the placements of the number of backups are further constrained based, in part, on maximum allowable unbacked up periods of time for the number of backups.

13. A non-transitory computer readable medium comprising computer readable program code, which when executed by a computer processor enables the computer processor to perform a method for providing backup services to entities, the method comprising:
  selecting an optimization periodicity based on a number of backups to be generated to meet a portion of recovery point objectives associated with the number of backups;
  making a determination that at least one of the portion of the recovery point objectives has a maximum allowable unbacked up period of time that is greater than the optimization periodicity;
  in response to the determination:
    load balancing the number of backups across multiple optimization periods of a balanced backup schedule demarcated by the optimization periodicity, wherein the load balancing comprises:
      constraining the number of backups to placement across the multiple optimization periods based on, in part, a limit on a total duration for backup generation during each of the multiple optimization periods to obtain a backup periodization of the number of backups; and
      adding backups of the number of backups to the respective periods of the balanced backup schedule based on the backup periodization;
    selecting a backup generation time for each of the to be generated backups in each of the optimization periods of the balanced backup schedule; and
    generating the number of backups using the balanced backup schedule.

14. The non-transitory computer readable medium of claim 13, wherein the method further comprises:
  selecting a second optimization periodicity based on a second number of backups to be generated to meet a second portion of the recovery point objectives;
  making a determination that none of the second portion of the recovery point objectives has a maximum allowable unbacked up period of time that is greater than the second optimization periodicity;
  in response to the determination:
    adding each backup to each optimization period of an unbalanced backup schedule;
    selecting a backup generation time for each of the second number of backups in each of the optimization periods of the unbalanced backup schedule; and
    generating the second number of backups using the unbalanced backup schedule.

15. The non-transitory computer readable medium of claim 13, wherein the placements of the number of backups are further constrained based, in part, on a second limit on which backup storages, used to store the number of backups, can store the number of backups.

16. The non-transitory computer readable medium of claim 15, wherein the second limit is adapted to aggregate a portion of the number of backups that are likely to include data that is duplicative of existing data stored in a backup storage of the backup storages.

17. The non-transitory computer readable medium of claim 13, wherein the placements of the number of backups are further constrained based, in part, on times required to generate the number of backups.

\* \* \* \* \*